April 21, 1953 W. DALLENBACH 2,635,338
DENTAL PROTHESIS
Filed Aug. 9, 1949
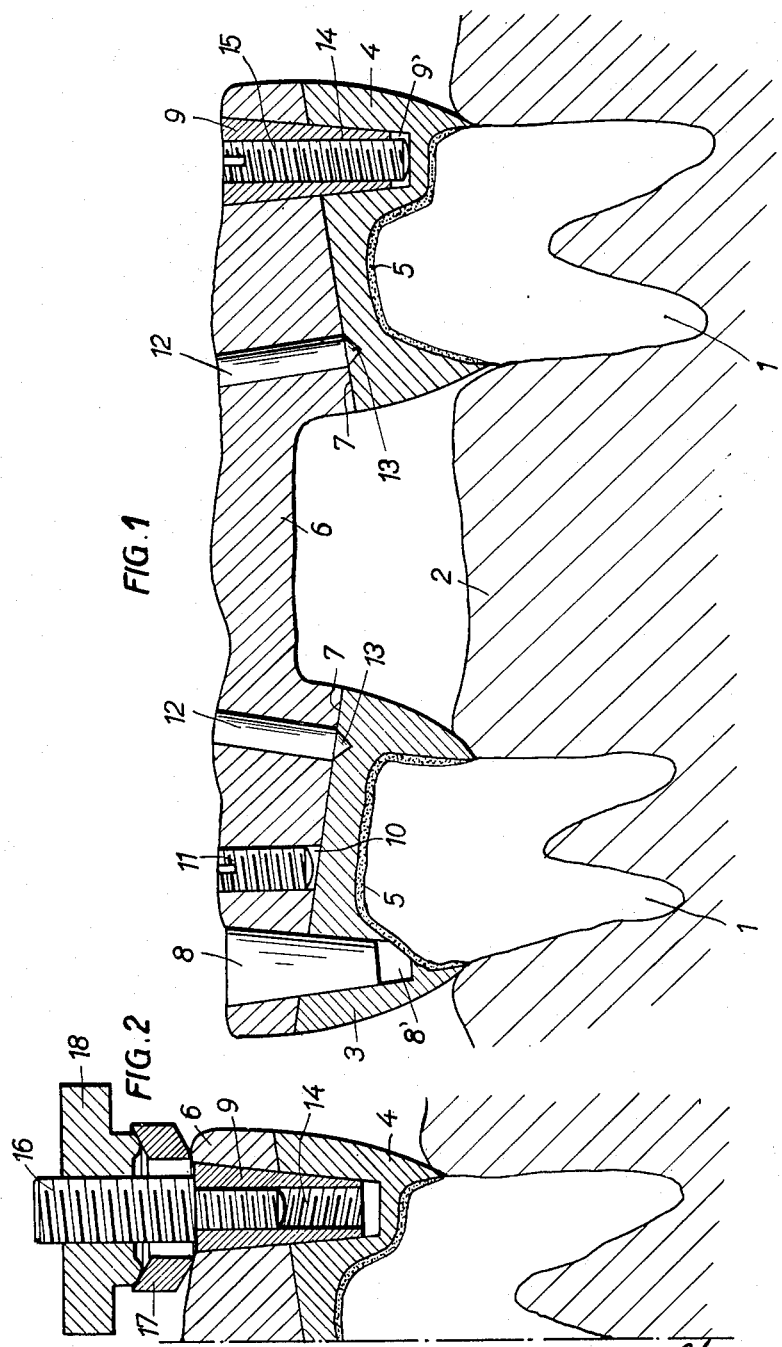
INVENTOR:
Walter Dällenbach
By E. F. Ottenderoth
Atty Patented Apr. 21, 1953

2,635,338

UNITED STATES PATENT OFFICE 2,635,338

DENTAL PROTHESIS

Walter Dällenbach, Zurich, Switzerland

Application August 9, 1949, Serial No. 109,363
In Switzerland August 13, 1948

6 Claims. (Cl. 32—5)

1

This invention relates to dental prothesis and more particularly to a detachable connection between two members of a dental prothesis of the removable type.

It is known in dentistry to anchor removable partial dental prothesis which have a purely dental support on remaining teeth, for example by a plurality of parallel cylindrical pins which are permanently fixed in the prothesis. These pins are inserted in corresponding bores of the tooth reinforcements (crowns, three-quarter crowns, and the like) of the remaining teeth. The insertion and the removal of the prothesis is effected by moving it in the common axial direction of the pins and bores. Upon insertion of the prothesis, this movement is limited by abutment shoulders of the tooth reinforcements bearing on complementary abutment faces of the prothesis. In this position the prothesis can be fixed, for example by means of set screws or simply by the friction of the pins forced into the bores. Although this technic is quite well developed, it has certain inconveniences which are the following:

1. It is not possible to bring two or more pins which are permanently fixed in the prothesis to a close fit in bores in the tooth reinforcements. The pins accordingly must be inserted with play in the bores and they will jam more or less, that is to say they will not be in exact axial alignment with the corresponding bores.

2. It is difficult to provide the pins in the prothesis and the corresponding bores in the tooth reinforcements in exact axially aligned relationship.

3. The condition that the prothesis can be mounted and removed only by movement in the direction of the axis of the pins and bores restricts the freedom in the conformation of the shoulders and complementary abutments-faces by means of which the prothesis bears on the remaining teeth.

It is an object of my present invention to provide a dental prothesis which avoids the above mentioned inconveniences and in which a detachable connection is effected by means of a fitting pin rigidly connecting two metal parts one with another, the pin being forced into registering bores in both metal parts.

Owing to the fact that the pin effecting the connection is removable from both the reinforcement of the remaining teeth and the prothesis, it is possible, before mounting the reinforcements on the remaining teeth to clamp the reinforcements and the prothesis together and to drill the registering bores in these two parts in a common

2 operation and particularly to ream the two bores in common. This is the only way to obtain a fitting seat without any play for the pin to be forced into the registering bores and also a rigid connection between the tooth reinforcement and the prothesis. In order to be able to conveniently insert and force the pin into its bore, and to remove it when necessary, it is advantageous to use conical pins having a taper of approximately 2%, and to ream the bore in the reinforcement and the prothesis with a conical reamer having the same taper. It is evident that with this new technic the pins for fixing the prothesis on the reinforcements of the remaining teeth do not require parallel axes. The pins securing the bridge plate to the crowns need no longer be parallel as has been necessary heretofore, and these pins may have any direction best suited for attaching the plate and according to the space available in the crowns around the tooth stumps. When mounting the prothesis the dentist is not limited to a movement of insertion in a single determined direction, but he is free to insert it in the most convenient manner, because first the prothesis is placed on the abutment faces of the reinforcements of the remaining teeth, and only afterwards the pins are inserted in the corresponding bores. Forcing of the pins into the bores can be effected by means of hammer or by means of a screw clamp attached to the reinforcement. Removal of a pin is conveniently effected by means of a screw introduced into a threaded hole.

The invention will now be described with reference to the accompanying drawing in which, Figure 1 is a sectional view of a prothesis fixed to the reinforcements of two tooth stumps.

Figure 2 shows the manner of extracting a connecting pin from the prothesis.

The numeral 1 indicates two teeth shown in elevation which project with their stumps from the gums 2. The tooth stumps carry as base reinforcements the crowns 3 and 4, preferably made from precious metal and permanently fixed to the stumps, for example by cement 5. The upper faces of the two crowns are preferably ground to be plane and bear the bridgework 6 by means of its two counter abutments 7, which have also ground plane faces. The bridgework may consist also of precious metal. Conical pins 8 and 9 made preferably of precious metal are inserted in bores 8' and 9', respectively provided in the bridgework 6 and the crowns 3 and 4, and serve for rigidly connecting the bridgework 6 to the crowns 3 and 4.

Guide pins 12 traverse the bridgework 6 and are soldered thereto. The conical point 13 of the pins have a relatively wide cone angle and project from the surface 2 of the bridge abutment face to engage a corresponding recess in the crown 3. The pins 12 with their conical ends 13 prevent any rotation of the crowns 3 or 4 about the axes of the fitting pins 8 or 9 relatively to the bridgework 6.

A threaded hole 10 is provided in the bridgework 6 in proximity of the pin 8, and when the prothesis is in use a slotted screw stud 11 is inserted in the hole 10. When this screw 11 is screwed further into the hole 10, it bears against the crown 3 and allows removal of the bridgework 6 with the pin 8 from the crown 3.

The fitting pin 9 is provided with an axial bore 14 filled out by a slotted screw stud 15 when the prothesis is in use. When this screw 15 is further screwed into the threaded bore 14 it bears against the bottom of the hole 9' in the crown 4 and allows removal of the pin 9 from the crown.

As shown in Fig. 2, the pin 9 can also be loosened by removing the screw stud 15 from the threaded hole 14 and screwing a threaded pull rod 16 into the hole 14 of the pin 9. The pin 9 can then be removed for example in the same manner as a pulley is pulled off a shaft. A conical washer 17 is made to bear against the bridgework 6, while a nut 18 screwed on the pull rod 16 and bearing on the washer 17 causes the pin 9 to be pulled out of the crown 4 and of the bridge 6, when the nut is screwed down. This latter method of loosening and removing the connecting pins is to be given preference, since in this manner the prothesis, that is the bridgework 6 is only lifted off from the crowns 3 and 4 after the pins 8 and 9 have been pulled out.

If a tooth stump would not extend sufficiently out of the gums to receive a crown, it is possible to insert a socket as base reinforcement for the reception of a connecting pin into the root of the tooth. With tooth stumps as represented in the drawing it is also possible to provide the bore for receiving a connecting pin in an extension provided laterally of the crown. Instead of being applied to a bridge supported by two teeth, the invention can also be used for mounting partial prothesis supported on three, four or still more remaining teeth. The number of the required connecting pins increases correspondingly, and it is possible to use more than one pin per tooth. The invention can also be used to provide a detachable connection for partial prothesis having in part a dental and in part a gingival support. A partial prothesis as described can also be made to fit a single tooth stump only. The prothesis would in this case form a cap or top member fixed to the base reinforcement 4, by example, by means of a fitting pin 9 and a guide pin 12; when later on an adjacent tooth head must be replaced, then the cap can be removed and a bridgework such as 6 can be fixed to the two adjacent reinforced tooth stumps.

I claim:

1. A dental prothesis of the removable type, comprising two metallic members bearing against each other, the two members being provided with registering conically shaped bores, a conical dowel pin driven into said registering bores, one of said members having a threaded hole extending therethrough, and a screw lodged in said hole and adapted to bear against the other member, whereby said conical dowel pin may be loosened and the two metallic members separated when screwing down said screw to exert pressure against said other member.

2. A dental prothesis of the removable type, comprising two metallic members bearing against each other, the two members being provided with registering conically shaped bores, a conical dowel pin forced into said bores for connecting the two members, said pin having a threaded hole extending axially therethrough, and a pressure screw adapted to be screwed into said threaded hole and to bear against one of said members for driving said pin out of the registering hole.

3. A dental prothesis of the removable type comprising two metallic members bearing against each other, said members being provided with registering conically shaped bores, a tapered pin forced into said bores for connecting the two metallic members, said pin being provided with a threaded hole axially extending therethrough, said threaded hole being adapted to receive a screw serving to pull the tapered pin out of the registering bores.

4. A dental prothesis adapted to be removably attached to a tooth stump, a base reinforcement on the tooth stump, said prothesis being formed as cap member for bearing on the base reinforcement and being provided with a conically shaped bore registering with a similar bore in the base reinforcement, a conical dowel pin forced into said registering bores for connecting the cap member to the base, said pin being provided with a threaded hole axially extending therethrough and adapted to receive a screw, and a guide pin secured to said cap member and having a conical end projecting from the cap member and engaging a corresponding conical recess in the base reinforcement.

5. In a dental bridgework of the removable type, comprising in combination, a metallic bridgework, a plurality of metallic tooth crowns, said bridgework being removably connected to said plurality of metallic tooth crowns, said bridgework being provided with bores registering with bores in the crowns, tight fitting pins forced into said bores for connecting the bridgework to the crowns, a guide pin secured to said bridgework and having a conical end projecting from the bridgework and engaging a corresponding conical recess in a crown, said bridgework being provided with a threaded hole extending therethrough in proximity of one of said registering pin receiving bores, said threaded hole being adapted to receive a screw for exertion of pressure against a crown to drive the connecting pin out of the adjacent bore in the crown.

6. A dental supported prothesis comprising a plurality of crowns each mounted on one tooth, a bridge carried by said crowns, said crowns and said bridge having corresponding contact surfaces, said bridge and some of said plurality of crowns being provided with registering conical bores, a tight fitting taper pin driven into each two registering bores, said taper pins each having a threaded hole extending axially therethrough and a screw stud therein for removal of said pins from said bores for permitting separation of the bridge from the crowns.

WALTER DÄLLENBACH.

References Cited in the file of this patent

UNITED STATES PATENTS

| Number | Name | Date |
| --- | --- | --- |
| 1,638,820 | Baratt | Aug. 16, 1927 |
| 1,649,905 | Lasky | Nov. 22, 1927 |
| 1,780,117 | Craigo | Oct. 28, 1930 |